Patented June 30, 1942

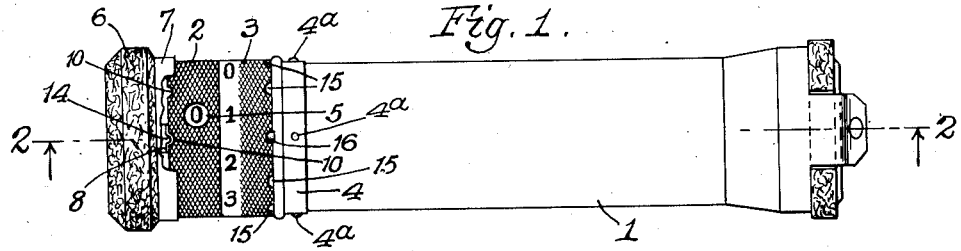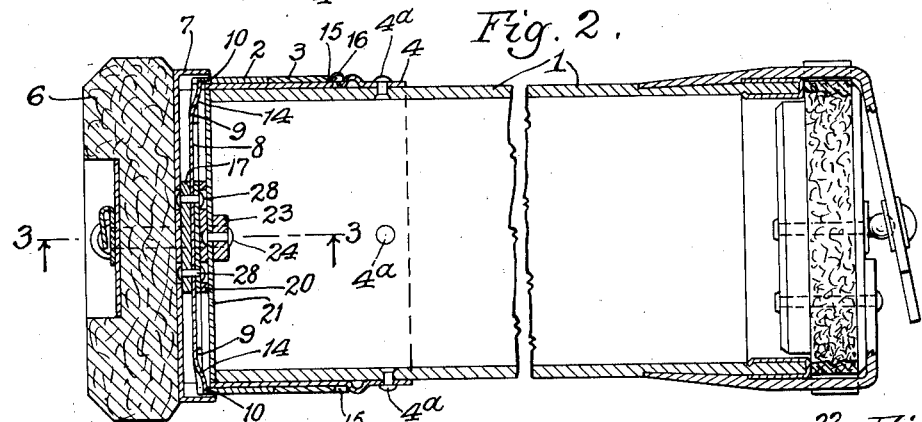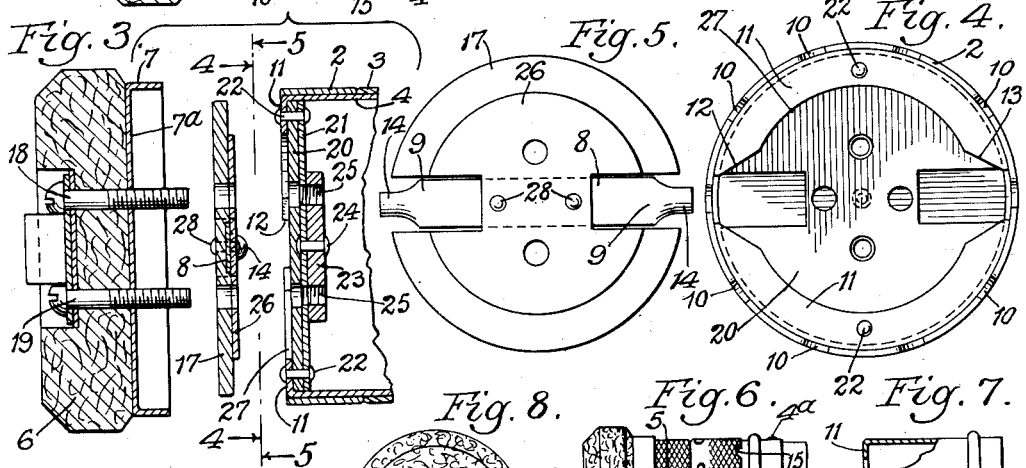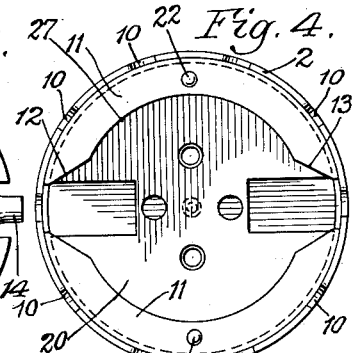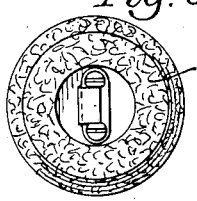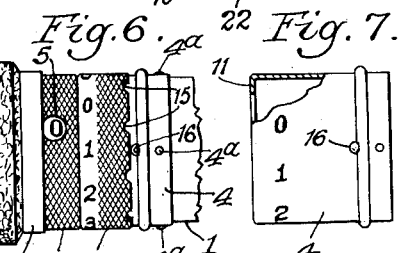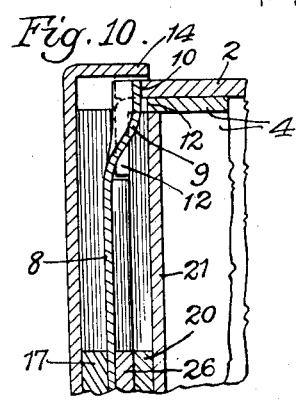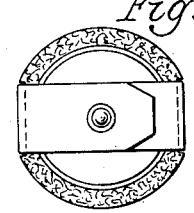
Inventor.
Maurice P. Anderson.
by Parker & Carter
Attorneys.

2,288,427

UNITED STATES PATENT OFFICE 2,288,427

PNEUMATIC TUBE CARRIER

Maurice P. Anderson, Chicago, Ill.

Application August 2, 1940, Serial No. 349,693

6 Claims. (Cl. 243—35)

This invention relates to pneumatic tube carriers and has for its object to provide a new and improved device of this description.

The invention has as a further object to provide a pneumatic tube carrier having an adjustable indicating device for indicating the station to which the device is to be sent or from which it is sent, which will not be displaced or deranged while the carrier is being transferred from one point to another. The invention has as a further object to provide a pneumatic tube carrier having an adjustable indicating device for indicating the station to which the device is to be sent or from which it is sent and which has a spring attached to the carrier, engaging a series of notches on a part associated with the indicating device, and which is arranged to prevent deformation of the spring and associated parts. The invention has as a further object to provide a pneumatic tube carrier having an adjustable indicating device, with means for preventing the parts from being deformed so as to interfere with the operation of the indicating device.

The invention has further objects which are more particularly pointed out in the accompanying description.

Referring now to the drawing, Fig. 1 is a side view showing one form of my invention;

Fig. 2 is an enlarged sectional view taken on line 2—2 of Fig. 1, with parts broken away;

Fig. 3 is a sectional view taken on line 3—3 of Fig. 2, with the end pieces separated;

Fig. 4 is a view of the end of the receptacle as seen along the line 4—4 of Fig. 3;

Fig. 5 is a view of the intermediate elements seen along the line 5—5 of Fig. 3;

Fig. 6 is a view showing one of the rings of the indicating device in an intermediate position;

Fig. 7 is a view showing the stationary part of the indicating device, with parts broken away;

Fig. 8 is an end view of the front end of the device;

Fig. 9 is an end view of the rear end of the device;

Fig. 10 is an enlarged sectional view with parts removed and parts broken away, showing the end of the locating spring in its operative position.

Like numerals refer to like parts throughout the several figures.

Referring now to the drawing, there is illustrated a pneumatic tube carrier having the receptacle 1 in which the material to be carried is received. Carriers of this type are sent from one department or place to another, or from a central station to various departments or locations, and it is necessary to indicate the department or station from which the carrier comes or the department to which it is to be sent. For this purpose the receptacle 1 is provided with an indicating device which consists of the separately movable rings 2 and 3. Beneath the ring 2 is a stationary member 4 which as shown consists of a cylindrical part fastened to the receptacle 1 by the fastening devices 4a and which has indicating characters thereon, such as numbers. The movable ring 2 is provided with an opening 5 therein through which one of these numbers or characters may be seen, as shown in Fig. 1. The ring 3 is provided with a series of indicating characters or numbers on its exterior which cooperate with the indicating characters or numbers on the part 4. By these two indicating rings and characters, stations from 00 to 99 may be designated.

The front end of the carrier is provided with an end piece 6 preferably of non-metallic material, such as felt, and has attached thereto a cup-shaped member 7, the edge of which passes down over the edge of the ring 2, see Fig. 2. There is also attached to the end piece 6 a spring locating member 8 which has its ends 9 preferably bent inwardly, which ends engage notches 10 in the edge of the ring 2. The stationary part 4 has a bent over edge 11 which has recesses 12 and 13 into which the ends 9 of the spring locating member 8 are received, see Figs. 2, 5 and 10. The ends 9 of the spring locating member are preferably formed with curved portions 14 at their extreme ends, which curved portions ride along the edge of the ring 2 when it is turned and drop into the notches 10 in said ring as the notches come opposite the ends of spring locating member. These ends therefore locate the ring 2 so that its numbers will be in proper position to be exposed through the opening 5, but permit it to be easily changed to the number that is exposed through the opening 5. The ring 3 has a series of notches 15 in its edge and these notches engage a locating projection 16 on the stationary part 4.

When it is desired to rotate the ring 3 it is moved or pushed up toward the end 6 of the carrier until the notch 15 which engages the projection 16 is moved out of engagement with the projection 16, whereupon the ring can be turned. The movement of the ring toward the end of the carrier is made possible by the bending of the spring member 8 and when the projection 16 is out of any of the notches 15 of the ring 3, the ring 2 cannot be turned. so that while the ring 3 is being turned, the ring 2 is held in position to maintain the same character exposed through the opening 5 therein.

It was found in practice with the construction heretofore used that the blows received on the end 6 when the carrier was in use, caused a bending of the spring 8 intermediate its ends so as to in effect, shorten the spring, so that in many instances these ends were caused to be withdrawn from the notches 10 and engage the inner face of the ring 2 so that the ring, instead of being held by the spring in the notches, was held by the end or ends of the spring engaging the inner face of the ring, thereby interfering with the movement of the ring to set it and making it exceedingly difficult to move such ring to any of its setting positions. These blows also caused a compression on the entire front end assembly, which had a tendency to loosen the entire assembly and render it defective. In the present construction these defects are eliminated by the following means.

There is inserted in the cup-shaped member 7 a disc 17 through which pass the screws 18 and 19, by means of which the end piece 6 is fastened in position. There is a closing member on the inside of the hollow receptacle 1 which may be made in any desired form. As herein shown, it consists of a disc 20 inside of the stationary part 4, which is preferably of non-metallic material and which has attached to it a disc 21 of metallic material, the two discs being attached to the bent over edge or flange 11 of the stationary part 4 by the fastening devices 22. The edge of the disc 21 rests upon the end of the wall of the receptacle 1, see Fig. 2. There is also a piece 23 which is attached to the metal disc 21 by the fastening device 24 and which has threaded openings 25 for the screwthreaded ends of the fastening devices 18 and 19. There is a disc 26 attached to the disc 17 which fits into the space 27 between the inner edges of the flange 11 and the disc 20. The spring 8 is located between the disc 17 and the disc 26, as shown in Fig. 3, and is fastened in position by the fastening devices 28. It will thus be seen that when the parts are assembled, the space between the bottom 7a of the cup-shaped member 7 and the top of the member 20 is entirely filled so that there can be no bending or displacement of the parts and of the spring 8 and that the disc 26 fills in the space 27 between the inner edge of the flange 11 so that the flange cannot be bent. This construction prevents distortion of the parts and of the spring due to hammering of the end of the carrier, to which it is subjected when in use.

It will be seen that the spring 8 provides a non-locking locating device engaging the edge of the ring 2 so as to hold the ring against accidental displacement, but still permits it to be rotated by the user.

I claim:

1. A pneumatic tube carrier comprising a hollow receptacle for receiving material, open at both ends, an adjustable indicating device at one end comprising a cylindrical part having an inwardly turned flange attached to said hollow receptacle, a ring rotatably mounted upon said part and having a series of notches on its edge, a closing member on the interior of said hollow receptacle, attached to said flange, an end piece of non-metallic material, a cup-shaped member connected therewith, a disc in said cup-shaped member, and a spring connected with said disc, a portion of said disc fitting into the space on the interior of the flange on said cylindrical part so as to maintain the ends of said spring in proper engagement with said ring.

2. A pneumatic tube carrier comprising a hollow receptacle for receiving material, open at both ends, an adjustable indicating device at one end comprising a cylindrical part having an inwardly turned flange attached to said hollow receptacle, a ring rotatably mounted upon said part and having a series of notches on its edge, a closing member on the interior of said hollow receptacle, attached to said flange, a disc engaging the closing member for the hollow receptacle, and a spring connected with said disc and having its ends in contact with the edge of said ring, a portion of said disc fitting into the space on the interior of the flange on said cylindrical part so as to maintain the ends of said spring in proper engagement with said ring.

3. A pneumatic tube carrier comprising a hollow receptacle for receiving material, open at both ends, an adjustable indicating device at one end comprising a cylindrical part, a ring rotatably mounted upon said cylindrical part and having a series of notches on its edge, a spring locating member having its ends engaging the edge of said ring, two members, one on each side of said spring locating member for holding said spring locating member against deformation due to blows received on the ends of said carrier when in use, so as to maintain said spring locating member in position to properly engage the edge of said ring.

4. A pneumatic tube carrier comprising a hollow receptacle for receiving material, open at both ends, an adjustable indicating device at one end comprising a cylindrical part having an inwardly turned flange attached to said hollow receptacle, a ring rotatably mounted upon said part and having a series of notches on its end, a closing member on the interior of said hollow receptacle, attached to said flange, the inner face of said closing member engaging the end of the hollow receptacle, an end piece of non-metallic material, a cup-shaped member connected therewith, a disc of non-metallic material in said cup-shaped member, a second disc connected therewith, and a spring intermediate said two discs, said second disc engaging the closing member for the hollow receptacle and fitting into the space on the interior of the flange on said cylindrical part, the ends of said spring engaging the said notches on said ring.

5. A pneumatic tube carrier comprising a hollow receptacle for receiving material, an adjustable indicating device at one end, comprising a rotatable ring, a non-locking locating device engaging the edge of said ring so as to hold the ring against accidental displacement, but permits it to be rotated by the user, and means for holding said non-locking locating device against deformation due to blows received on the ends of said carrier when in use, so as to maintain said non-locking locating device in position to properly engage the edge of said ring at all times, said means comprising two members between which said non-locking device is received and which are fastened thereto.

6. A pneumatic tube carrier comprising a hollow receptacle for receiving material, an adjustable indicating device at one end, comprising a rotatable ring, a series of notches in the edge of said ring, a non-locking locating spring engaging the edge of said ring and the notches therein, which holds the ring against accidental displacement, but permits it to be rotated by the user, and a holding member extending across said hollow receptacle, a fastening device by means of which said holding member and spring are fastened together and a supporting member for said holding member and said spring to prevent deformation of said spring due to blows received on the ends of said carrier when in use, so as to maintain said non-locking locating spring in position to properly engage the edge of said ring and said notches at all times.

MAURICE P. ANDERSON.